United States Patent
Stewart

[11] 3,710,074
[45] Jan. 9, 1973

[54] ELECTRICALLY HEATED MULTIPLE GLAZED WINDOW HAVING AN IRIDESCENCE MASKING FILM

[75] Inventor: John L. Stewart, Apollo, Pa.

[73] Assignee: PPG Industries, Inc., Pittsburgh, Pa.

[22] Filed: Oct. 8, 1970

[21] Appl. No.: 79,076

[52] U.S. Cl. ............... 219/203, 52/171, 52/203, 350/1
[51] Int. Cl. ......... E06b 7/12, G02b 5/26, H05b 3/26
[58] Field of Search ....... 219/203, 543; 52/171, 202, 52/203; 350/1

[56] References Cited

UNITED STATES PATENTS

| 1,176,313 | 3/1916 | Pfund | 350/1 |
|---|---|---|---|
| 2,087,802 | 7/1937 | de Bayer-Krucsay | 350/1 |
| 2,444,976 | 7/1948 | Brown | 350/1 |
| 3,091,006 | 5/1963 | Sahlertz | 350/1 X |
| 2,501,418 | 3/1950 | Snowden | 219/203 UX |
| 2,725,319 | 11/1955 | Tarnopol | 219/543 X |
| 2,750,832 | 6/1956 | Morgan | 219/543 X |
| 3,192,575 | 7/1965 | Rosenau et al. | 219/543 UX |
| 3,379,859 | 4/1968 | Marriott | 219/203 X |
| 3,524,920 | 8/1970 | Stromquist et al. | 219/203 X |

Primary Examiner—R. F. Staubly
Attorney—Chisholm and Spencer

[57] ABSTRACT

A multiple glazed window unit having an electro-conductive coating and bus bars on the enclosed space surface of one of its glass panels is used to reduce condensation, drafts, and room heat loss adjacent to the window when the outside temperature is below that inside. A selective reflecting film on the enclosed space surface of one of the panels improves the heat insulating character of the unit and reduces visible iridescence common to electroconductive films. The selective reflecting film has an absolute infrared reflectance of at least 0.7 and sufficient visible light reflectance for the substantial elimination of visible iridescence.

6 Claims, 7 Drawing Figures

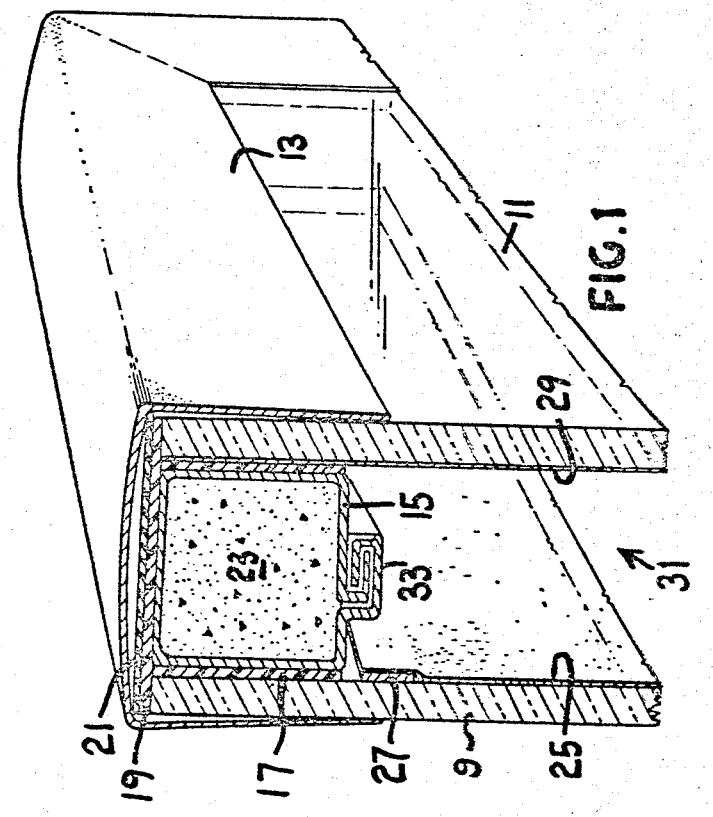
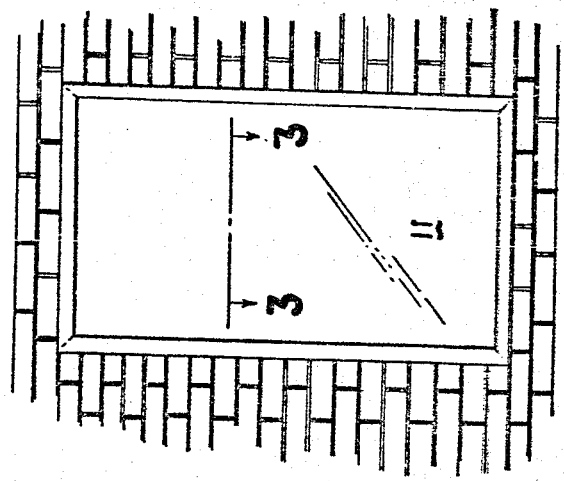
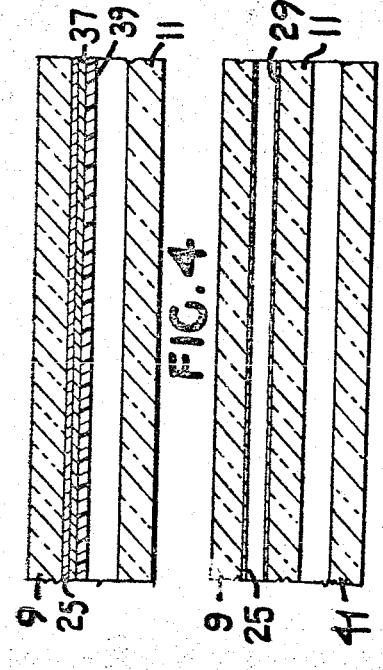

KEY FOR FIG. 6

——————— (A) REFLECTANCE — ENERGY INCIDENT ON COPPER COATING

— — — — — (B) REFLECTANCE — ENERGY INCIDENT ON GLASS [.230 INCH THICK] COPPER COATING OPPOSITE SIDE

—o—o—o— (C) REFLECTANCE — ENERGY INCIDENT ON TIN OXIDE COATING [150 Ω/SQUARE]

— · — · — (D) REFLECTANCE — ENERGY INCIDENT ON GLASS WITH COPPER COATING IN MULTIPLE GLAZED UNIT, PREFERRED EMBODIMENT [.659 INCH OVERALL THICKNESS]

············ (E) REFLECTANCE — ENERGY INCIDENT ON GLASS WITH TIN OXIDE COATING IN UNIT OF (D)

— — · — — (F) EMISSIVITY — COPPER COATING EQUAL TO [1.0 − TRANSMITTANCE − REFLECTANCE (A)]

FIG. 6A

INVENTOR
JOHN L. STEWART

ATTORNEYS

TOOL HOLDER FOR AUTOMATIC SCREW MACHINE

BACKGROUND OF THE INVENTION

This application is a continuation-in-part of my earlier application of the same title filed July 28, 1969, under Ser. No. 845,416 and now abandoned.

While automatic screw machines have long been adapted for use in machining cup-shaped workpieces, it has been characteristic of the setups required in accomplishing this task that the present approaches have certain disadvantages. One approach has been to utilize several successive stations in the multiple spindle machine for forming the inside and bottom walls thereof, and also in forming the upper or outer rim or edge thereof. More commonly a tool holder is provided with a canted cutting tool suitably formed at its cutting end for forming the desired cup-shaped depression in the workpiece. The first mentioned approach suffers from the disadvantage that the dimensional tolerances which can be held between the bottom or inner wall of the workpiece and the rim or edge thereof are severely limited when successive stations in the machine are required to be used in the machining operation. The last mentioned approach suffers from the disadvantage that wear of the cutting tool itself causes excessive dimensional variations for event the shortest workpiece runs in the machining operation.

The primary object of the present invention therefor, is to provide a tool holder for use in a automatic screw machine wherein cup-shaped workpieces can be machined or formed at a single station with the dimensional tolerances between successive workpieces being held within acceptable levels even for relatively long workpiece runs in the machining operation.

A more specific object of the present invention is to provide a novel tool holder for use in an automatic screw machine wherein a plurality of cutting tools is arranged on a single workpiece holder for use at a single station of a multispindle machine, all of which cutting tools are independently adjustable with respect to one another and with respect to the principal axis of rotation of the workpiece being machined at a particular station.

SUMMARY OF THE INVENTION

The present invention relates generally to tool holders for use in automatic screw machines, and deals more particularly with a novel tool holder wherein a first or primary elongated cutting tool of generally rectangular cross-section is adjustably mounted in the tool holder, and wherein one or more secondary or auxiliary cutting tools can be oriented in either perpendicular or parallel relationship to the primary cutter in the same tool holder. The tool holder comprises a base portion adapted for attachment to the ways provided on the axially reciprocable work support fixtures of the automatic screw machine, and slide blocks are provided on suitable ways defined in an upstanding web or leg on the base so as to permit both cutting tools to be adjustably mounted thereon.

BRIEF DESCRIPTION OF THE DRAWINGS

FIG. 1 is a perspective view showing the relevant portions of an automatic screw machine, with a tool holder of the present invention being mounted on the axially reciprocable tool support fixture for movement toward and away from a workpiece provided at a particular spindle station in the machine.

FIG. 2 is a perspective view of the tool holder of the present invention showing the inner, or cutting ends of the first and second cutting tools.

FIG. 3 is a perspective view of the tool holder of FIG. 2, being taken from the outer or rear side thereof.

FIGS. 4A, 4B and 4C show slide blocks of alternative construction for carrying primary cutting tools of different size.

FIG. 5 is a plan view of the tool holder and assembled cutting tools shown in FIGS. 2 and 3.

FIG. 7 is an elevational view of a tool holder of alternative design wherein the first and second tools are oriented parallel to one another.

FIG. 8 is a plan view of the FIG. 7 holder with a cup-shaped workpiece being shown in broken lines in this and in the preceding view.

FIG. 9 is an end-on front view of the holder showing the tools in relation to the workpiece.

DETAILED DESCRIPTION OF THE FIRST PREFERRED EMBODIMENT (FIGS. 1 - 6)

Figure 6:
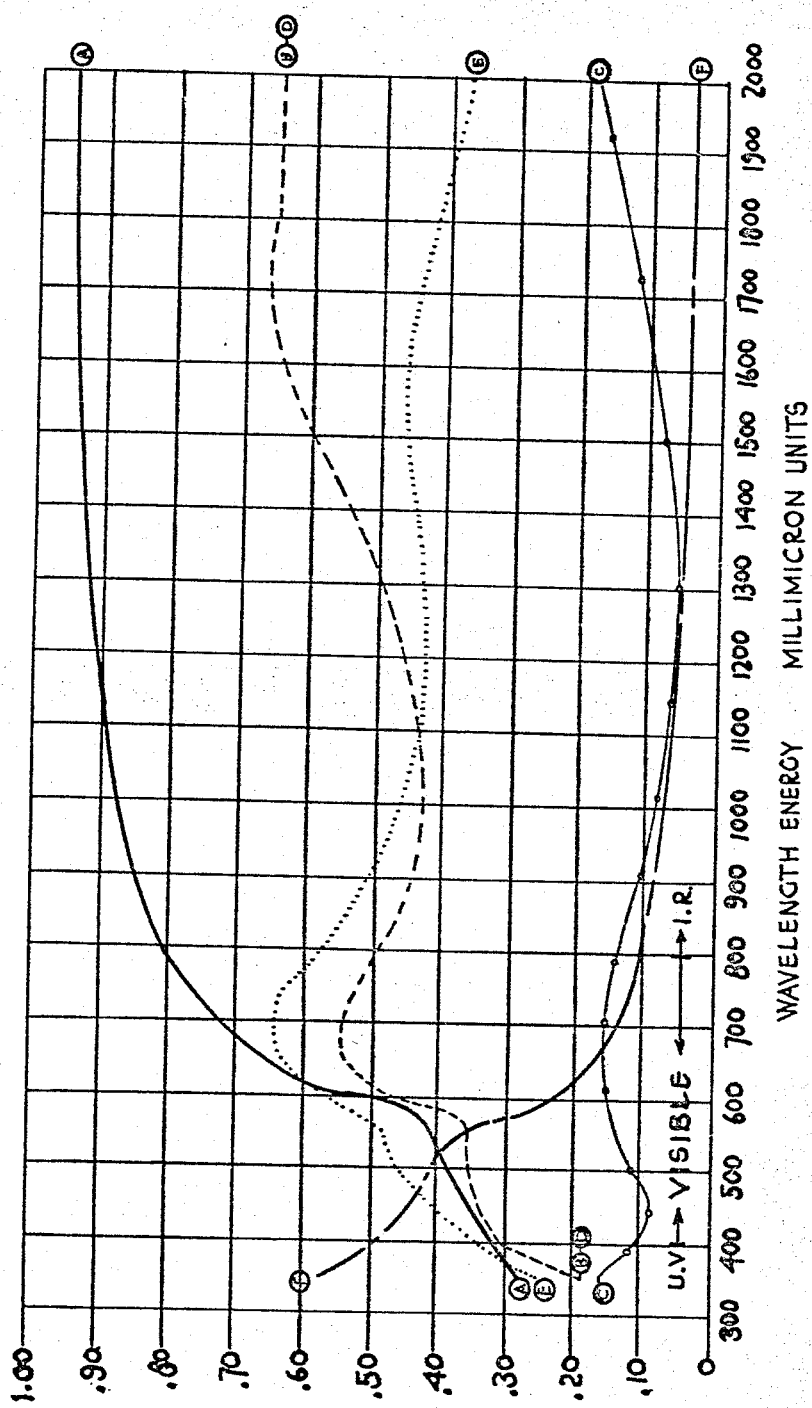
FIG. 6 is a sectional view taken on the line 6—6 of FIG. 5 showing the cutting tools in elevation as seen from the inner end of the tool holder.

Turning now to the drawings in greater detail, FIG. 1 shows a multi-spindle automatic screw machine of the type with which the present invention is adapted for use, the turret of the machine being indicated generally at 10, and the spindle stations being indicated at 12a through 12g inclusively. In such an automatic screw machine the turret is adapted to be rotated in the direction of the arrow 14, and the material from which the workpieces are to be formed are advanced from right to left to the various stations 12a-12g inclusively. Thus, a plurality of rods of barstock are adapted to be fed from the rear of the machine to these work stations and to be rotated at these stations as indicated by the arrow 16 at station 12c. At this particular station a bar is provided from which the workpiece will ultimately be formed in a final severing step by a cutoff tool (not shown). A tool support fixture is adapted to be moved axially in the direction of the arrow 20 for movement of a plurality of tools toward and away from the workpieces at the various stations in the machine. One such tool is shown at 22, being constructed according to the present invention and is adapted for movement between the relative positions shown as the tool fixture 18 oscillates axially in a conventional manner.

FIG. 2 shows one embodiment of the present invention as viewed from the rear or turret associated end of the machine, and as shown said tool holder comprises an L-shaped base 24 having a lower leg 26 with a keyway or slide being defined on the underside thereof for permitting attachment of the tool holder to the tool support fixture 18 of the automatic screw machine at a particular axial position. An upstanding web, or leg 28, of the tool holder base 24 has provided thereon suitable means for supporting a first elongated cutting tool 30 oriented in generally parallel relationship to the principal axis and to the axis of rotation of the workpiece 16. A second cutting tool 32 is also mounted to the upal of interest to that for a black body. Emissivity is numerically equal to absorption relative to a black body and so may be estimated for a film on a transparent substrate as (1.0-transmittance-reflectance). Films having an overall emissivity less than 0.9 and an overall absolute reflectance greater than 0.5 and having an infrared emissivity less than 0.6 and an infrared absolute reflectance greater than 0.7 are preferred.

Transparent light and heat-reflecting coatings may be applied to substrates by techniques similar to those for application of transparent electroconductive coatings, for the coating materials are similar and often identical. For example metallic copper may be applied to a glass panel surface according to the method taught by Miller in U. S. Pat. No. 3,457,138.

The details and advantages of the invention are further described in conjunction with a description of the drawings, in which:

FIG. 1 is a sectional view of a typical multiple glazed window illustrating the relation of the electroconductive film and a reflecting film on the outside panel;

FIG. 2 is an elevation of a typical building wall section in which a multiple glazed window unit is mounted;

FIGS. 3, 4, and 5 are partial sectional views showing several arrangements of the two films present in the multiple glazed window of FIG. 2. Each of these embodiments may be used to particular advantage under specific circumstances; and FIG. 6 is a representation of the spectral response of selected materials used in this invention.

In its preferred embodiment this invention comprises two panels of glass, one having a tin oxide coating and mounted to the interior of a building with the coating on the surface facing toward the outside and one having a metallic copper coating mounted to the exterior of the building with the coating on the surface facing toward the inside. The panels are spaced from each other, sealed about their edges and held by a peripheral frame so that a hermetically sealed enclosed space is formed between the panels with the coatings facing into this space.

FIG. 1 shows such a glazed window unit having an inside glass panel 9 and an outside glass panel 11 disposed in parallel relation one to the other. A metal spacer 15 having a hollow interior filled with a desiccant 23 and having an integral lock seam provided with apertures or channels 33 through which air and moisture may pass separates the two glass panels 9 and 11 and extends around the margins thereof enclosing the space 31 between the panels. A moisture-resistant mastic 17 bonds the glass panels 9, 11 to the spacer 15 forming an enclosed chamber 31 which is thus hermetically sealed. A moisture barrier, such as a plastic sheet material, 21 is bonded by moisture-resistant mastic 19 around the periphery of the combination, and a rigid channel 13 is disposed about the unit placing a compressive force upon the unit and giving stability to it. A transparent electroconductive coating, such as tin oxide 25 is present on the enclosed space surface of the inside glass panel 9 and bus bars 27 (only one shown) are bonded to the electroconductive coating. A transparent heat reflective film 29 such as copper is bonded to the enclosed space surface of the outside glass panel 11.

Other embodiments having a structural arrangement like that already described may be fabricated with bus bars compressively held against the electroconductive film by a resilient organic spacer which replaces the metal spacer of the preferred embodiment. In such units the bus bars are not bonded to the glass and are hidden from view by the resilient spacer. Hiding of the bus bars in this manner along with use of a light absorbing spacer results in units having superior esthetic qualities. The sheet material moisture barrier may be eliminated and mastic filled out in contact with the frame to form a moisture barrier.

As observed in FIG. 3, units constructed having two transparent panels and each having a film coating may be varied to use different materials of construction. Inside panels 9, while generally clear glass, may be colored glass as well. Electroconductive films 25 coated on the enclosed space surface of the inside panel 9 will generally be tin oxide, but may be copper, gold, silver, or any common conductive material suitable for transparent coating. Outside panels 11 may be colored or clear glass. The transparent panels may be made of durable organic materials, such as polycarbonates, rather than glass. Transparent light and heat-reflecting films 29 coated on the enclosed space surface of the panel 11 will typically be metallic or metal oxide materials. In addition to copper, other metals, such as gold, silver, chrome, platinum, palladium, nickel and metals from the 4th period of the periodic table of elements may be used to prepare suitable coatings. So long as the applied coatings have controlled thickness to permit light transmission and heat reflection according to the emissivity and reflectivity constraints disclosed any from the group may be used.

Reflective films may also be applied in contact with the electroconductive coating on the enclosed space surface of the interior glass panel. One arrangement for applying a reflective film to the surface having the electroconductive coating is illustrated in FIG. 4. An organic film 39 having on one surface, a thin metallic deposit 37, is placed in contact with the electroconductive film 25 and bonded to it with an adhesive so that the thin metallic deposit 37, which is highly reflective, is disposed between the electroconductive material 25 and the organic film 39. Since the organic film is an electric insulator, the electroconductive film is completely sandwiched within an insulating envelope and safeness of the unit, in the event of accidental breakage, is enhanced so long as the broken glass particles remain attached by the adhesive to the film. Polyester films coated with metallic aluminum and adhesive have proven useful and are easily bonded to the conductive coating on glass.

A further embodiment of this invention utilizes a third transparent panel mounted parallel to the first two as shown in partial section in FIG. 5. An inside panel 9 with an electroconductive coating 25 and an outside panel 11 with a transparent heat-reflecting coating 29 are joined as described above with reference to FIG. 3. A third transparent panel 41 is mounted parallel to the first two and positioned toward the exterior of the building. This added panel will generally be colored glass or have a color coating to coordinate with the building exterior.

It is contemplated that the transparent light and heat-reflecting film used in conjunction with each electroconductive film will be selected according to its spectral response characteristics. As may be observed in FIG. 6 the transmittance of a copper film on clear glass and a tin oxide coating on clear glass effectively shield from solar energy in both the ultraviolet and infrared regions. The copper coating effectively reflects energy in the infrared region emitted from the electroconductive film when it is heated.

The multiple glazed windows understood by the attached drawings and the descriptions above have been tested under realistic environmental conditions. The following examples are illustrative of these tests.

EXAMPLE I

One unit comprising two panels of clear glass 2 feet by 4 feet and having a copper film on the enclosed space surface of the exterior panel and no electroconductive coating on any surface is mounted in the wall of a box having thermostatically controlled heating means to maintain an average air temperature of about 80°F within the box. A second unit, similar to the first except having an electroconductive coating of tin oxide on the enclosed space surface of the interior panel is mounted in the wall of a similar box. The tin oxide coating has a resistivity of about 150 ohms per square and is about 270 mmu thick. The unit is provided with bus bars connected to a thermostatically controlled electrical source to maintain the inside glass temperature at the inside atmosphere temperature of 80°F. Both units are exposed to outdoor winter conditions for about 280 hours. The experimental results are shown in Table I and the results may be summarized as follows: average outdoor glass temperature is the same for both units, the average overall outdoor temperature is about 33°F so that the test period covers about 323° days (this corresponds on an 8 month heating season basis to the average conditions of Great Falls, Minnesota); the indoor glass surface temperature of the unit having an electroconductive coating is about 76°F, which is only about 4°F below the indoor room air control temperature, and the resistance heating used power at a rate of about 2.6 kilowatt per hour of operation while operating about 10 percent of the overall exposure time. By comparison, the average indoor glass surface temperature of the unit without an electroconductive coating was fully 13°F below the desired indoor room air temperature.

The heater operating time depends upon the thermostatic control used to operate the heater. With a conventional dead band permitting temperature variations of about ± 5°F, the heater does not operate continuously but is turned on when the minimum temperature is reached and off when the maximum is reached.

A degree day is defined according to accepted engineering and architectural standards as the product of the hours during which the outside temperature is below 60°F and the difference in temperature from 60°F divided by 24. Resistances as ohms per square are measured as the resistance diagonally across a square area of coating of uniform thickness. Such resistances are comparable only for films of equal thickness and are reported with thicknesses determined by conventional optical interference techniques.

EXAMPLES II-IV

Example I merely points out the advantages of using an electrically heated inside glass panel to control inside glass temperatures preventing condensation and drafts. The following examples, which are summarized in Table II, demonstrate the value of this invention to prevent excessive heat losses from electrically heated units.

The unit of Example I, which represents a heated window unit which is similar to heated double glazed freezer windows, is the first unit of this tabulation. As is apparent from the tabulation, the visual appearance of such a unit is poor and the average power requirement to maintain the indoor temperature at the inside panel surface is higher than for other examples. Group II examples are for units using colored glasses for outside panels without transparent light and heat-reflecting films. These units have heating power requirements the same as for the unit of Example I but have slightly improved visual characteristics. Group III examples are for units using clear and colored glasses for outside panels with a pyrolytic coating containing cobalt on the enclosed space surfaces. These units have improved heat transfer and shading characteristics for external solar energy but require as much heating power as the unit of Example I. These units have improved visual characteristics.

The Group IV examples, which include the preferred embodiment using a copper coating on the enclosed space surface of the outside panel, have greatly improved heat transfer and shading characteristics for external solar energy. These units have substantially

TABLE I

[Test data for multiple glazed units in environmental test boxes]

| Test period, hours | Outdoor glass temperature (° F.) | | | | | | Indoor glass surface temperature (° F.) | | | | | | Average outdoor air temp. and range (° F.) | Heater operating time (hrs.)* | Electric power used (Kwh.) |
|---|---|---|---|---|---|---|---|---|---|---|---|---|---|---|---|
| | Copper-tin oxide | | | Copper-clear glass | | | Copper-tin oxide | | | Copper-clear glass | | | | | |
| | High | Avg. | Low | High | Avg. | Low | High | Avg. | Low | High | Avg. | Low | | | |
| 23 | 42.0 | 39.3 | 37.5 | 43.0 | 39.1 | 35.0 | 77.0 | 74.0 | 70.0 | 69.5 | 67.7 | 56.0 | 34.9, 32.5 to 37.0 | 1.325 | .350 |
| 24 | 43.5 | 36.6 | 31.5 | 44.5 | 36.9 | 31.5 | 78.0 | 75.5 | 72.0 | 70.0 | 67.4 | 65.5 | 32.2, 28 to 37.5 | 1.950 | .515 |
| 72 | 66.5 | 46.2 | 35.5 | 68.0 | 45.4 | 33.0 | 79.5 | 74.1 | 70.0 | 74.5 | 70.2 | 67.0 | 42.6, 28.5 to 55 | 2.770 | .714 |
| 72 | 44.5 | 38.9 | 33.0 | 46.0 | 38.8 | 32.0 | 79.5 | 75.1 | 71.5 | 71.0 | 67.9 | 66.5 | 33.8, 28.5 to 41.5 | 4.736 | 1.255 |
| 24 | 45.0 | 37.2 | 27.5 | 46.5 | 46.9 | 26.0 | 79.0 | 76.2 | 71.5 | 72.0 | 68.3 | 65.5 | 32.4, 22.5 to 40.0 | 1.961 | .519 |
| 21 | 42.0 | 31.5 | 25.5 | 42.0 | 28.9 | 23.0 | 81.0 | 77.4 | 75.0 | 67.0 | 62.9 | 60.5 | 25.2, 19.0 to 34.5 | 2.310 | .610 |
| 24 | 43.5 | 33.9 | 27.5 | 42.5 | 33.2 | 26.0 | 80.5 | 77.0 | 73.5 | 70.5 | 67.4 | 65.5 | 27.7, 23.0 to 34.0 | 2.000 | .528 |
| 24 | 48.0 | 25.1 | 18.0 | 46.0 | 23.9 | 17.0 | 84.5 | 81.0 | 76.5 | 72.5 | 65.5 | 62.5 | 16.3, 13.0 to 21.5 | 3.400 | .890 |
| 284¹ | | ²38.24 | | | ²39.47 | | | ²75.64 | | | ²67.80 | | ²33.1 | ¹20.382 | ²5.381 |

¹ Total.
² Average.

*Accumulated time during test that power was applied to the electroconductive coating.

TABLE II

[Electrically heated *1 multiple glazed window performance properties]

| Example | Outside panel *2 glazing material | Summer *3 Heat transfer coefficient U-B.t.u./ hr. sq. ft. °F. | Shading *6 coefficient | Winter *4 Heat transfer coefficient U-B.t.u./ hr. sq. ft. °F. | Power density watts/ sq. ft. | Visual appearance- iridescence |
|---|---|---|---|---|---|---|
| I | Clear glass | .5971 | .5134 | .4785 | −19.272 | Objectionable to the eye. |
| II | Blue-green glass | .5971 | .5134 | .4785 | −19.272 | Do. |
|  | Neutral gray glass | .5971 | .5134 | .4785 | −19.272 | Less objectionable. |
|  | Neutral bronze glass | .5971 | .5134 | .4785 | −19.272 | Do. |
| III | Coated clear *5 | .5761 | .5495 | .4785 | −19.272 | Do. |
|  | Coated blue-green | .5977 | .4372 | .4785 | −19.272 | Do. |
|  | Coated gray | .5977 | .4372 | .4785 | −19.272 | Do. |
|  | Coated bronze | .5977 | .4372 | .4785 | −19.272 | Do. |
| IV | Copper coated clear | .5058 | .2054 | .4181 | −15.298 | No iridescence apparent. |
|  | Copper coated blue-green | .5058 | .2054 | .4181 | −15.298 | Do. |
|  | Copper coated gray | .5058 | .2054 | .4181 | −15.298 | Do. |
|  | Copper coated bronze | .5058 | .2054 | .4181 | −15.298 | Do. |

*1. Inside panel of each unit coated with electroconductive tin oxide film on the enclosed surface.
*2. Outside panels glazed with coating materials on enclosed space surface.
*3. Summer conditions: Outdoor air, 98.0° F.; indoor air and glass, 75° F.; solar intensity, 249.6 B.t.u./hr. sq. ft.
*4. Winter conditions: Outdoor air, −4.0° F.; indoor air and glass, 75° F.; solar intensity, 0.0.
*5. Light and heat reflecting coating, any of a group of fired coatings containing cobalt and any other metal of the 4th period of the Periodic Table of Elements.
*6. Shading coefficient defined as the ratio of solar heat gain through a multiple glazed window unit to that through a single pane of double strength clear sheet glass of equal area.

lower heat transfer to the outside under winter conditions than does the unit of Example I, and the power required to maintain the inside panel at room temperature is reduced by about 25 percent. These units have superior visual appearance as the common irridescence of tin oxide films is effectively masked.

From examples II through IV, it is evident that the combination of an inside panel having an electroconductive coating and an outside panel having a base glass, whether clear or heat absorbing, upon which is bonded a transparent light and heat-reflecting coating, provides a multiple glazed window unit of superior heat insulating and visual character.

Units having nickel or titanium dioxide coatings on the enclosed space surface of the outside panel perform about midway between those of Examples III and IV. Units having gold or chrome coatings on the enclosed space surface of the outside panel perform about the same as those of Example IV.

The above description of the invention is intended to be exemplary and not limiting upon the scope of the invention, except as set forth in the accompanying claims. For example, although the claims recite units comprising a pair of panels it will be apparent from the disclosure and from the claims that additional panels may be included along with the two panels having coatings in facing relationship. Such units comprising more than two panels would also be within the scope of the accompanying claims.

I claim:

1. A multiple glazed window unit for separating a thermally controlled space from an environment comprising two transparent panels disposed in parallel relation to one another, designated as a first panel for facing said controlled space and a second panel for facing said environment, spacing means marginally disposed between the panels separating one from another and sealing means disposed around the panel edges forming a hermetically sealed enclosed space therebetween, a transparent electroconductive coating on the enclosed space surface of said first panel and electrical source means connected thereto and a transparent, light and heat reflecting coating having an absolute infrared reflectance of at least 0.7 on the enclosed space surface of said second panel, said light and heat reflecting coating having sufficient visible light reflectance to substantially eliminate apparent iridescence observable from said electroconductive coating.

2. The multiple glazed window unit of claim 1 wherein said electroconductive coating comprises a transparent metal oxide film and said transparent light and heat reflecting coating has an emissivity less than 0.9 overall and less than about 0.6 for wavelengths between 800 millimicron units and 2250 millimicron units.

3. The multiple glazed window unit of claim 1 wherein said electroconductive coating comprises a transparent metal oxide film and said transparent light and heat reflecting coating comprises a metallic coating selected from a group consisting of platinum, palladium, copper, chrome, nickel, gold, aluminum, titanium and silver.

4. The multiple glazed window unit of claim 3 wherein said electroconductive coating comprises tin oxide and said transparent light and heat reflecting coating comprises copper.

5. The multiple glazed window unit of claim 4 wherein the panels are glass.

6. A building having a wall opening in which is mounted a window unit comprising two transparent panels disposed in parallel relation to one another, spacing means marginally disposed between said panels spacing them apart from one another, sealing means disposed around the edges of said panels forming a hermetically sealed enclosed space therebetween, a transparent electroconductive coating disposed on the enclosed space surface of the panel adjacent the building interior and electrical source means connected thereto and a metallic, transparent, light and heat reflecting coating having an absolute infrared reflectance of at least 0.7 and sufficient visible light reflectance to mask the iridescence of said electroconductive coating disposed on the enclosed space surface of the panel facing the exterior of the building.

* * * * *